(No Model.)
H. R. ESHELMAN.
PROTRACTOR.
No. 472,531. Patented Apr. 12, 1892.
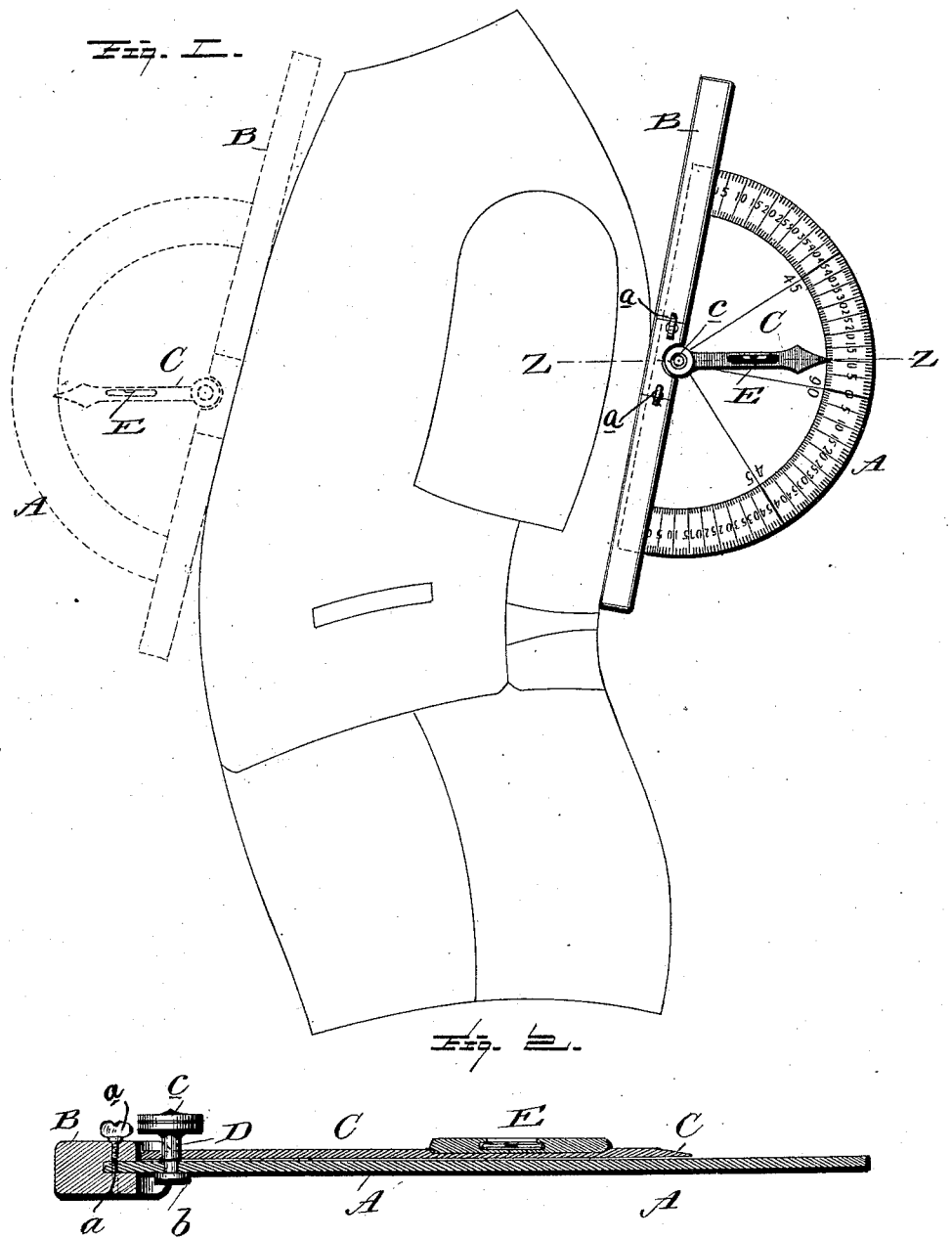
Witnesses
L. C. Hills.
E. H. Bond
Inventor
Henry R. Eshelman,
per Chas. H. Fowler,
Attorney

UNITED STATES PATENT OFFICE.

HENRY R. ESHELMAN, OF READING, PENNSYLVANIA.

PROTRACTOR.

SPECIFICATION forming part of Letters Patent No. 472,531, dated April 12, 1892.

Application filed February 2, 1892. Serial No. 420,068. (No model.)

*To all whom it may concern:*

Be it known that I, HENRY R. ESHELMAN, a citizen of the United States, residing at Reading, in the county of Berks and State of Pennsylvania, have invented certain new and useful Improvements in Protractors; and I do hereby declare that the following is a full, clear, and exact description of the same, reference being had to the annexed drawings, making a part of this specification, and to the letters of reference marked thereon.

This invention relates to certain new and useful improvements in protractors designed to be used in measuring the human form to detect in what position the person is standing, and also in garment-drafting.

The novelty resides in the construction of the device, as will be hereinafter more fully described, shown in the drawings, and then particularly pointed out in the claim.

The invention is clearly illustrated in the accompanying drawings, which, with the letters of reference marked thereon, form a part of this specification, and in which—

Figure 1 is a view showing the manner of use of my improved protractor. Fig. 2 is a section through the device on the line *z z* of Fig. 1.

Like letters of reference indicate like parts in both views.

Referring now to the details of the drawings by letters, A designates the protractor having all the degrees marked thereon, as shown, running from "0" to "45" and from "45" to "0." The protractor is connected to a ruler B in any suitable manner—as, for instance, as shown in Fig. 2, wherein the protractor is shown as being fitted in a kerf in the ruler and held therein by pins *a*. Any other means, however, may be employed for holding the ruler and protractor together so long as they are readily detachable, so that they may be separated and the protractor used for drafting.

C is an arrow or pointer pivotally held to the protractor at the center of the circle on which the same is struck. It is pivotally held in place, as shown in Fig. 2, in which D is a pivot-pin held in the protractor, so as to turn therein, and provided with a collar or washer *b* upon the under side of the protractor to prevent its pulling out. It is held fast to the pointer or arrow and is provided with a head *c*, by which it may turned to turn the pointer or arrow, as will be readily understood from Fig. 2. The ruler is cut out at the point of attachment of the pointer, so as to permit the pivot being located at the center, as seen in both views. The pointer or arrow carries a spirit-level E, as shown.

The manner of use of the above-described instrument will be readily understood by any one familiar with the use of such devices or any garment-cutter. In Fig. 1 I have illustrated two different positions of use. In full lines is shown the manner of obtaining the inclination and indentation of the back, waist and in dotted lines the manner of obtaining the run of the front. To get the slope of the shoulders or hip or any other desired information it is only necessary to apply the rule in the proper position, the degrees being indicated by the pointer, which should in all cases be arranged perfectly level, as will of course be understood. After the desired inclinations or indentations or slopes of the different parts have been determined the protractor can be detached from the rule and is ready for use in drafting.

What I claim as new is—

The herein-described measuring implement, consisting of a ruler having a longitudinal kerf in one edge, a protractor having one side fitted in said kerf, thumb-screws for detachably holding the ruler and protractor together, a pointer pivotally held at the center of the circle from which the protractor is struck, a spirit-level on the pointer, and a pivot-pin held in the protractor to turn therein and fast in the pointer and provided with a washer upon the under side of the protractor, the ruler being cut away opposite the said pivot, substantially as and for the purpose specified.

In testimony that I claim the above I have hereunto subscribed my name in the presence of two witnesses.

HENRY R. ESHELMAN.

Witnesses:
   E. H. NOYES,
   JOHN K. HOWDEN.